H. UITING.
AUTOMATIC GRAIN PICKLER.
APPLICATION FILED JAN. 22, 1917.

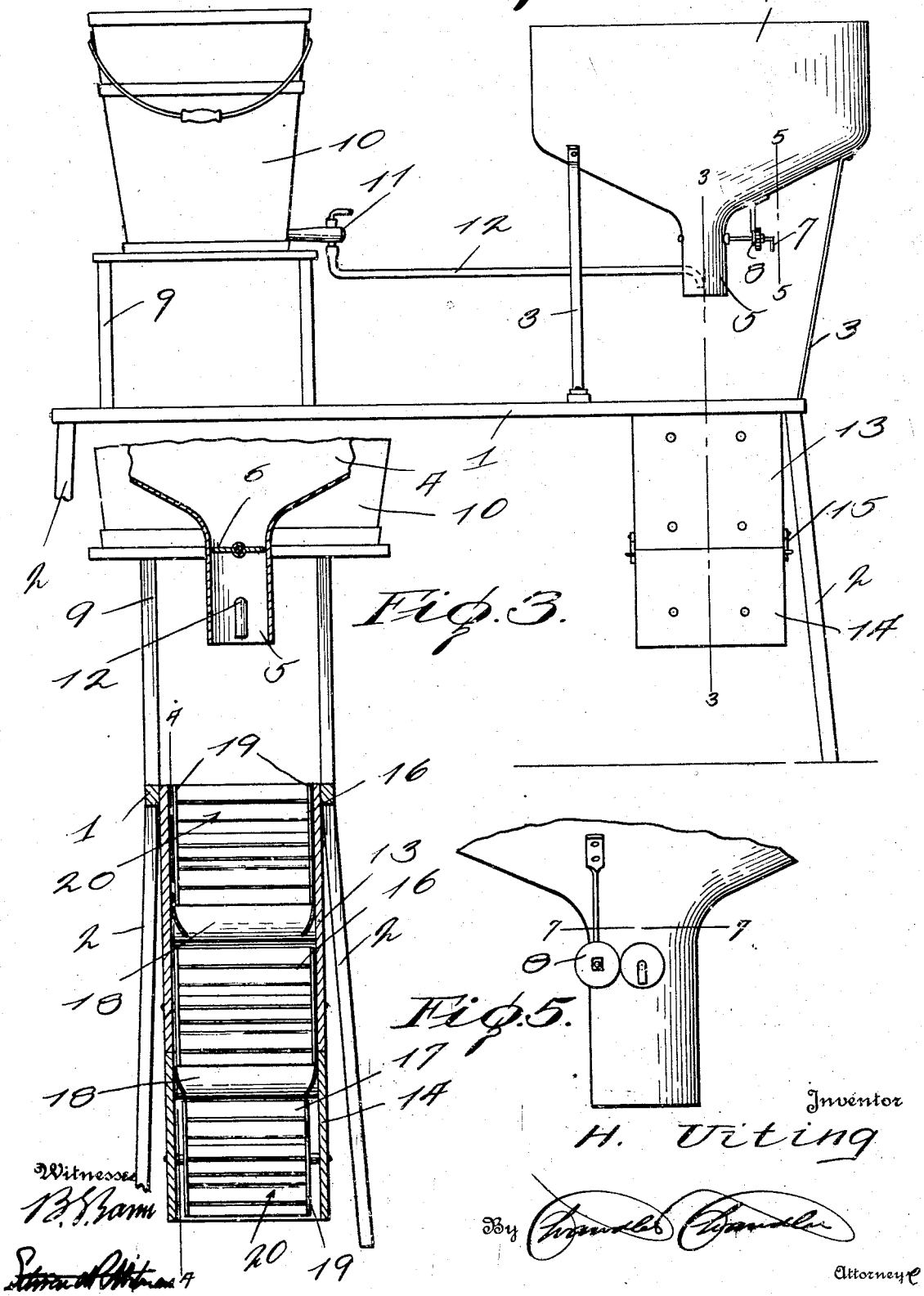

1,279,791.

Patented Sept. 24, 1918.
2 SHEETS—SHEET 2.

Inventor
H. Uiting

UNITED STATES PATENT OFFICE.

HENRY UITING, OF CARLYLE, SASKATCHEWAN, CANADA.

AUTOMATIC GRAIN-PICKLER.

1,279,791.              Specification of Letters Patent.    Patented Sept. 24, 1918.

Application filed January 22, 1917. Serial No. 143,692.

*To all whom it may concern:*

Be it known that I, HENRY UITING, a subject of the King of Great Britain, residing at Carlyle, in the Province of Saskatchewan, Dominion of Canada, have invented certain new and useful Improvements in Automatic Grain-Picklers; and I do hereby declare the following to be a full, clear, and exact description of the invention, such as will enable others skilled in the art to which it appertains to make and use the same.

This invention relates to grain pickling machines.

It is the object of the invention to provide a machine for pickling grain which will insure a perfect mixture between the grain and the pickling liquor, even where the lightest grains are passed through the apparatus. It has been difficult heretofore, to properly treat oats in the pickling machines which have been known to me, but by means of my improved apparatus, the oats are capable of being thoroughly mixed with the pickling liquor, the general arrangement of the parts, and the peculiar formation of the cylinders which serve to agitate the grain and mix it with the liquor coöperating to this end.

With the above objects in view and such others as will hereinafter appear, my invention will now be fully set forth and described, reference being had to the accompanying drawings.

In the drawings:—

Figure 1 is a side elevation of the machine,

Fig. 3 is a section on line 3—3 of Fig. 1,

Fig. 5 is a sectional detailed view on line 5—5 of Fig. 1,

Figure 6:
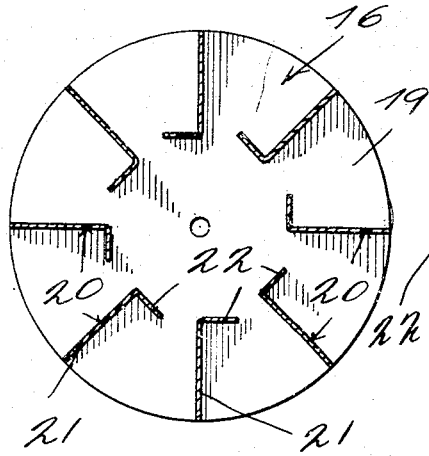
Fig. 6 is a transverse sectional detailed view of the cylinder structure.
Figure 2:
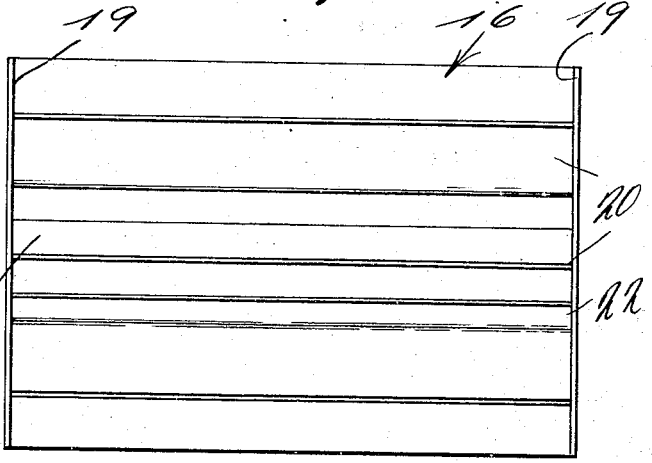
Fig. 2 is a side elevation of one of the drums.
Figure 4:
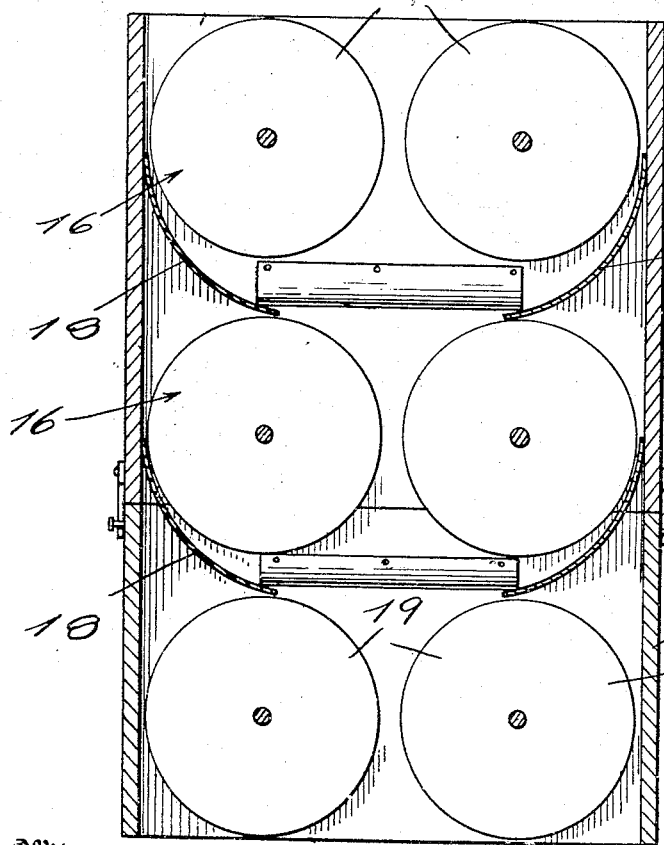
Fig. 4 is a transverse section on line 4—4 of Fig. 3.
Figure 7:
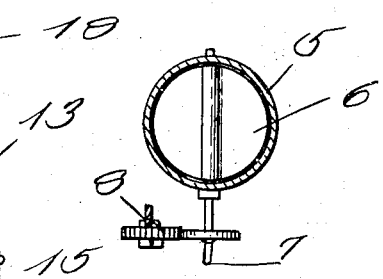
Fig. 7 is a section on line 7—7 of Fig. 5.

Referring more particularly to the drawings, 1 represents the sides of a frame work supported upon the standards 2, and upon the frame work 1 is supported a plurality of standards 3 which carry a hopper 4. The latter is tapered at the bottom to a central delivery opening which terminates in a spout 5. A rotary diaphragm or valve 6 controls the delivery of grain through the spout 5 and is controlled by a crank arm 7, a spring check 8 being employed to hold the crank arm 7 in adjusted position.

Mounted upon a super-structure 9 is a tank 10 for containing water or a pickling solution which is provided with a faucet 11 which is adapted to deliver the contents of the tank 10 into the pipe 12 whose opposite end passes through the side of the spout 5 and is downturned to deliver the water or liquor into the center of the column of grain which is passing out of the hopper. Removably mounted below the frame work 1, and centered below the spout 5, is a box-like structure consisting of the sections 13 and 14 which are imposed one upon the other and fastened together by means of the fastening devices 15. Mounted within the section 13 are two pairs of agitating cylinders 16 which are mounted one above the other so that the lower pair receives the grain which is discharged by the upper pair. Within the lower section 14 is mounted a similar pair of cylinders 17 which are also vertically alined below the upper pairs of cylinders and positioned to receive the grain which is discharged by the second pair. Within the section 13 and below each of the pairs of cylinders therein are provided the transverse and longitudinal baffle plates 18 which are positioned to deliver the grain within the area terminated by the longitudinal middle lines of the cylinders at suitable points between the ends of the cylinders. It should be noted at this point that the lower or third pair of cylinders 17 is of slightly less diameter than the cylinders 16 since the lower set of cylinders 17 is driven at a somewhat slower speed than the first and second pairs in the passage of the grain therethrough.

Each one of the cylinders 16 and 17 consists of a pair of end disks 19 and a series of longitudinal plates 20. Each one of the plates 20 consists of a comparatively wide radial blade 21 and a short transverse baffle 22 extending at right angles to the blade 21 at its lower or inner edge. The plates 20 extend from the peripheral edges of the end pieces 19 and terminate at approximately two-thirds of the distance of the centers of the disks or end pieces 19, and are there overturned to provide the baffles 22. The rear or free edges of the baffles 22 are spaced from the lower edges of the next blades 21, a distance which is approximately equal to the width of the baffles. Thus, as the cylinders of each pair rotate one upon another in the direction of the arrow, and receive the grain therebetween, it is received by the plates 20, and while some of it is retained by the baffles 22, the remainder falls through spaces between the baffles and the blades 21 across the center of the cylinders, and is caught by the baffles and plates at the opposite sides of the cylinders and is tossed about thereby until it finds its ways through the cylinders. The action of the three pairs of cylinders upon the grain is identical and by reason of the various combinations of actions which the cylinders set up in throwing the grain about, it is thoroughly mixed with the water before finally passing to the bottom of the section 14 from which it is delivered into a suitable receptacle.

The operation of my invention is obvious from the foregoing description, but the peculiar action of the cylinders upon the grain should be particularly noted, and that while the cylinders are arranged in pairs and coöperate to throw a certain quantity of the grain toward one another to mix it with the water or other liquor, the surplus may find its way into the interior of the cylinders and there be thrown about until it finally makes its way through the cylinders to the next set. Therefore,—the danger of choking the machine is overcome while the thorough mixing of the grain is assured.

What I claim as my invention is:—

1. A grain pickling machine, comprising in combination, a hopper and a fluid supply, superposed pairs of horizontally disposed agitating drums between which and through which the grain may be passed, and deflecting elements between the pairs of drums for directing the grain from one pair to the next within the limits of the peripheries of the drum.

2. A grain pickling machine, comprising in combination, a grain hopper and a fluid supply, and superposed pairs of agitating drums located in horizontal opposition and comprising spaced drum elements between which and through which the grain may fall from one pair to the next, and baffle plates disposed between the pairs of drums and extending inwardly from the sides and ends thereof to direct the grain inwardly between the peripheries of the drum.

3. In a grain pickling machine, a pair of horizontally opposed drums, each consisting of end plates and baffle plates mounted between the end plates and consisting of angle plates arranged in spaced relation around the end plates, and means for feeding grains between said drums.

4. In a grain pickling machine, a pair of horizontally opposed drums, each consisting of a pair of end plates and angle plates arranged in spaced relation around the end plates, said angle plates each having one of its blades arranged in radial relation and the other of its blades extending rearwardly toward and in spaced relation to the next adjacent angle plate, and means for feeding grains between said drums.

In testimony whereof, I affix my signature, in the presence of two witnesses.

HENRY UITING.

Witnesses:
 F. J. STENT,
 S. A. CORTEOES.